(No Model.) 3 Sheets—Sheet 1.

D. DRAWBAUGH.
ROTATING GRAIN WEIGHER.

No. 507,531. Patented Oct. 31, 1893.

(No Model.) 3 Sheets—Sheet 2.

D. DRAWBAUGH.
ROTATING GRAIN WEIGHER.

No. 507,531. Patented Oct. 31, 1893.

Witnesses:
J. M. Fowler Jr.
Alex Stewart

Inventor:
Daniel Drawbaugh,
By Church & Church
his Attorneys (No Model.) 3 Sheets—Sheet 3.
D. DRAWBAUGH.
ROTATING GRAIN WEIGHER.
No. 507,531. Patented Oct. 31, 1893.
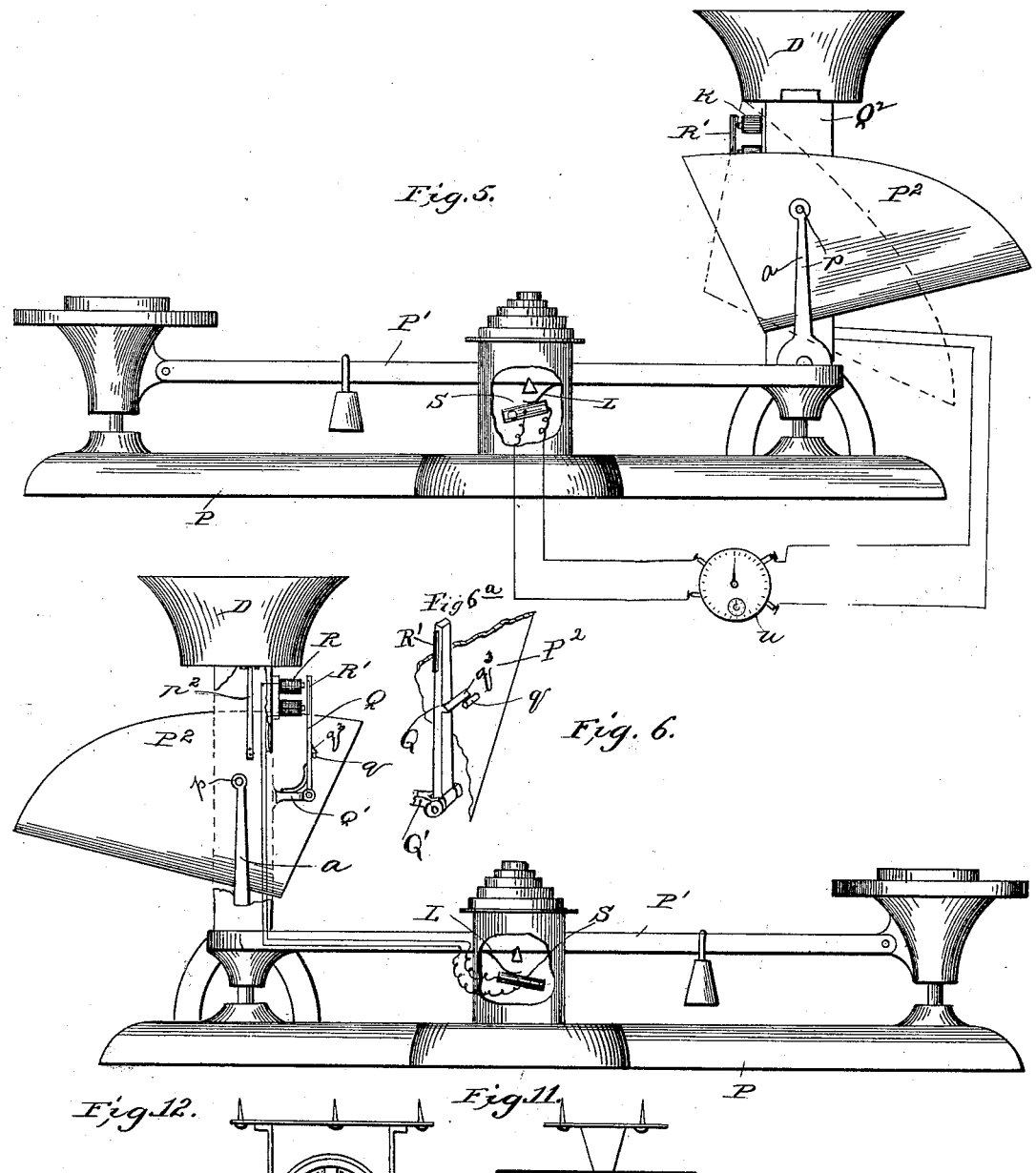

UNITED STATES PATENT OFFICE.

DANIEL DRAWBAUGH, OF EBERLY'S MILL, PENNSYLVANIA, ASSIGNOR TO THE AUTOMATIC AND ELECTRIC SCALE COMPANY, OF NEW JERSEY.

ROTATING GRAIN-WEIGHER.

SPECIFICATION forming part of Letters Patent No. 507,531, dated October 31, 1893.

Application filed August 9, 1892. Serial No. 442,571. (No model.)

*To all whom it may concern:*

Be it known that I, DANIEL DRAWBAUGH, of Eberly's Mill, in the county of Cumberland and State of Pennsylvania, have invented certain new and useful Improvements in Automatic Weighing-Scales; and I do hereby declare the following to be a full, clear, and exact description of the same, reference being had to the accompanying drawings, forming a part of this specification, and to the letters of reference marked thereon.

This invention relates to improvements in automatic weighing scales adapted particularly for measuring by weight grain, tea, coffee, rice and similar substances which will flow into and from a receptacle, the object of the invention being to simplify and improve the mechanical details, whereby greater accuracy and rapidity of operation are secured.

The invention consists in certain novel details of construction and combinations and arrangements of parts all as will be now described and pointed out particularly in the appended claims.

Figure 1:
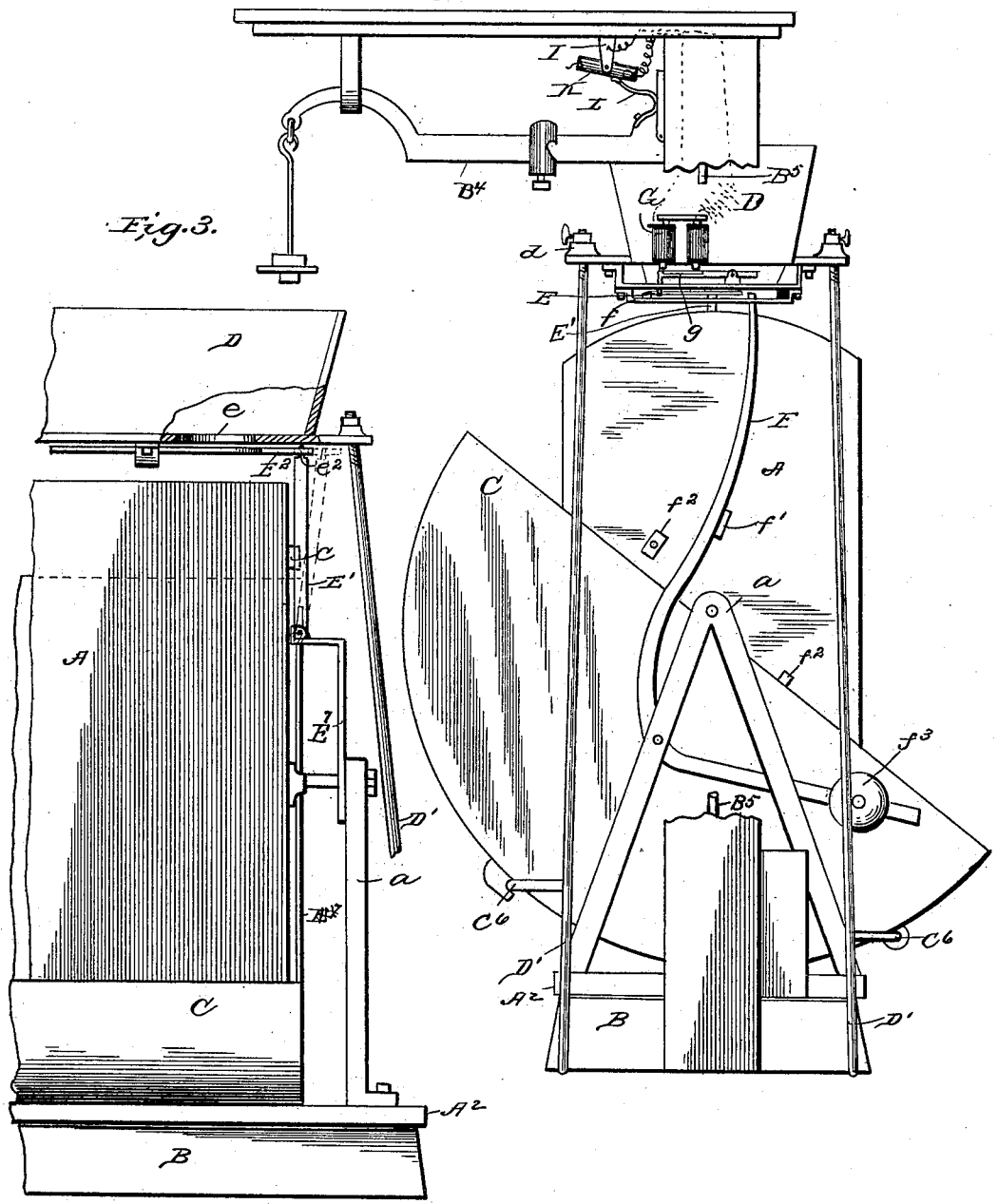
Figure 2:
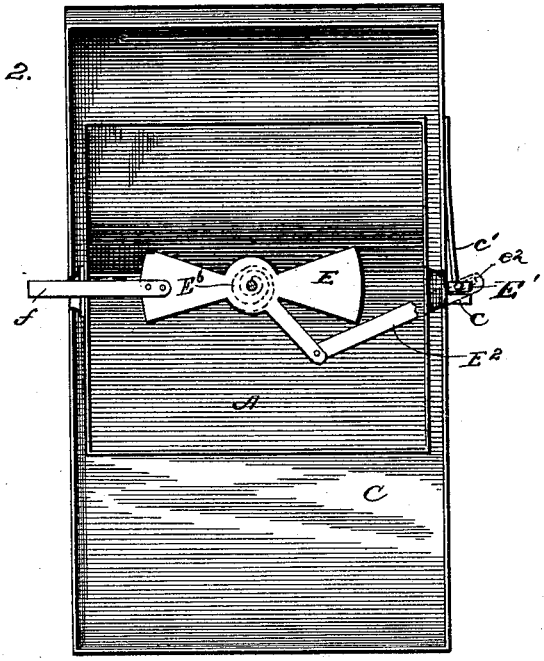
Figure 4:
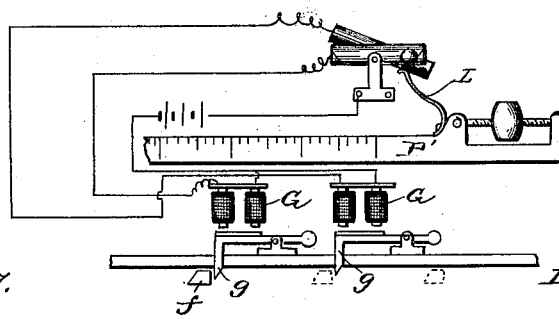
Figure 7:
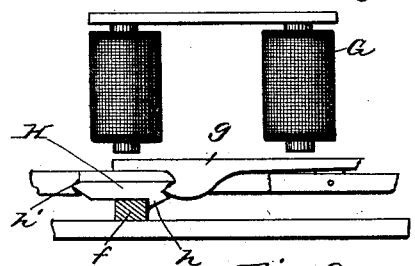
Figure 8:
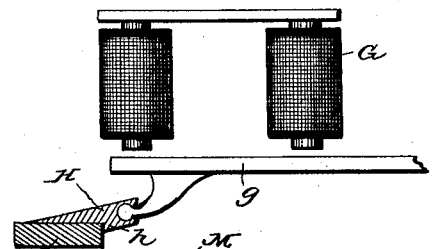

Referring to the accompanying drawings: Figure 1 is a side elevation of a scale constructed in accordance with my invention with portions of the standard broken away to show underlying parts. Fig. 2 is a detail of the cut off and connected parts. Fig. 3 is an elevation showing the lock for the rotary measuring vessel. Fig. 4 is a diagrammatic view showing the preferred means for tailing off or reducing the rate of supply as the measure becomes filled. Fig. 5 is a front elevation of a pair of counter scales embodying my present invention. Fig. 6 is a rear elevation. Fig. 6$^a$ is a detail perspective of the catch shown in Fig. 6. Figs. 7 and 8 illustrate the preferred form of catch or lock, and Figs. 9 to 12 are modifications of the gravitating contact maker.

Like letters of reference in the several figures indicate the same parts.

In illustrating the present invention I have shown two forms of scale, one approximating in mechanical structure the grain scales, illustrated in the patent to P. R. Grabill, No. 403,748, to which reference is made and the other being the ordinary counter or grocer's scale with the invention applied thereto.

In the first form a rotary measuring vessel A is pivotally mounted on standards $a$ secured on the platform $A^2$ of an ordinary platform scale B, having the usual beam $B^4$ and connections $B^5$ between the platform $A^2$ and beam. The construction of the measuring vessel and its supports is essentially similar to that shown in said patent and therefore need not be further described herein.

Beneath the measuring vessel and supported from the base in any suitable manner, as by rigid supports $C^6$ carried by the standards $D'$ is a chute C into which the grain is dumped while above the vessel is mounted a hopper D preferably carried by a spider $d$ adjustably secured at the corners to standards $D'$ extending up from the base.

In the bottom of the hopper an opening or openings $e$ are formed with a pivoted spring pressed cut off E for closing the same, to arrest the feed of grain to the measuring vessel. This cut off is closed by the central coil spring $E^6$ shown in dotted lines Fig. 2, to cut off the grain when the proper quantity has passed into the vessel and by its movement the vessel is released and allowed to discharge the grain. thus the possibility of the vessel turning while the grain is still being fed is avoided. To accomplish this the vessel is provided on one side with locking projections formed as shown by the projection $c$ and spring tongue $c'$ Fig. 2, and a lock or catch $E'$ Fig. 3, mounted on a fixed member E is adapted to engage therewith. The catch $E'$ is moved by the cut off to release the vessel through the medium of the arm $E^2$ on the cut-off (Figs. 2 and 3) having a slot $e^2$ in the end through which the upper end of the catch $E'$ projects.

In operation when the cut off closes it moves the catch back as shown in dotted lines, Fig. 3, releasing the vessel, when the weight of the grain turns the same, bringing the other end uppermost where it is automatically caught and held by the catch cooperating with the projection $c$ at the opposite end of the vessel. The cut off is returned to open position against the tension of spring $E^6$ by a lever F, pivoted to the vessel supports preferably below and to one side of the vessel pivots and in position for its upper end to engage the projecting end $f$ of the cut-off. A projection or lug $f'$ on the side of the lever is adapted to be struck by one or the other of a pair of lugs or projections $f^2$ on the side of the vessel. The pivots of the vessel and lever and the lugs are so positioned relative to each other, that as the vessel rotates the uppermost lug on the vessel engaging the lug on the lever, moves the lever over until the vessel just reaches upright or normal position, when the lugs pass owing to the eccentric relative position of the pivots of the lever and vessel and the lever under the influence of its weight $f^3$ returns to normal position. The lever F in its forward movement carries the cut off to open position against the tension of its spring (the latter as before mentioned being held in the box at the center of the cut-off) where the cut off is caught and held until released by the depression of the platform due to the weight of grain discharged into the vessel.

The major portion of my present invention relates to the mechanism for releasing the cut-off to stop the feed of grain to the movable vessel, for it is obvious, that unless this be done at just the right instant, and without imposing any appreciable work or weight on the beam or platform, accuracy cannot be secured. This has been heretofore one of the chief difficulties encountered in this class of scale.

To secure great accuracy and nicety of action I employ an electro magnet to release the catch for the cut off, and energize the magnet by means of a circuit made or broken through the medium of a gravitating contact set in motion by the movement of the platform or beam.

In the preferred construction the magnet G is mounted on the base of the hopper just above the path traversed by the end $f$ of the cut-off and the catch is connected to the armature $g$ of the magnet. The catch shown in Figs. 7 and 8 is preferred, and consists essentially of a catch lever H jointed to the armature $g$ and having a projection $h$ on the under side behind which the cut off arm $f$ is held. The end of the catch lever is pivoted in the support as at $h'$ in Fig. 7 or allowed to rest on the top of the arm $f$ as in Fig. 8 if desired; in the latter instance, however the connection between the lever and armature must be a hinge connection so as to hold the lever in position. In both forms the catch lever permits the arm $f$ to return to normal position and automatically engages it as in an ordinary spring or gravitating catch.

The circuit wires pass from the magnet to a battery located in a box on the standard or upright of the scale, thence to a point in proximity to the beam where one terminates in contact with the yoke or pivot support I for the tube K forming the gravitating contact. The tube K is preferably exhausted and contains a globule of mercury with contact points in electrical connection with the circuit wires and arranged to be connected by the mercury when the tube is inclined one way, and to be disconnected when the tube is inclined the other way. The pivots of the tube are so located that the mercury normally gravitates to the rear end leaving the circuit broken, but requiring but the slightest possible power to incline or tilt it in the other direction sufficiently to cause the mercury to run down and establish the circuit. The most handy way of tilting the tube is to secure a finger L to the base of the beam, which finger striking the under side of the tube as the beam rises, inclines it enough to let the mercury gravitate to the opposite end, thereby cutting off the supply of grain to the vessel.

Figure 9:

Instead of pivoting the tube on an independent support, it is obvious that it may be mounted directly on the beam as shown in Fig. 9, which arrangement is preferable because the beam may be then balanced with absolute accuracy. So too, instead of a globule of mercury a ball of carbon or similar conductor may be employed as shown, for instance in Figs. 11 and 12, wherein it will be seen that the terminals $i \, i'$ are located side by side in the end of a tube, which may be of metal lined with an insulator, and the carbon ball $i^2$ gravitates from one end to the other of the tube in a manner similar to the globule of mercury before described. The terminals in this instance should also be carbon concaved to fit the ball whereby a perfect contact is assured.

The gravitating contact it will be seen enables me to secure a firm and sure contact without imposing any additional weight on the beam or platform, such as would be the case if simple contacts were employed as heretofore.

Figure 10:
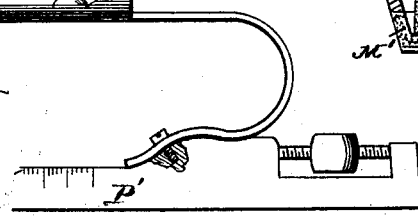

To secure the gravitating action it is obvious many devices may be employed in which the beam or platform moves the gravitating member up to the center while the contact is made instantly and always when the beam has been elevated exactly the same distance by the falling of such member upon a co-operating terminal contact; for instance in Fig. 10 an overweighted tongue M is seated on a terminal at the bottom of a conical cup M', one side of which is insulating while the opposite side holds a contact in position to be struck by the end of the gravitating tongue when the cup is inclined toward that side.

In Figs. 5 and 6 is shown an ordinary grocer's or counter scales adapted to weigh grain, &c., automatically. P indicates the scale frame, P' the balance beam and P² the scoop, which latter is pivoted on trunnions $p$ at each side and located with such relation to the scoop and its center of gravity, that when the scoop is empty, it gravitates to upright or normal position (see Fig. 5) and when filled the weight of the grain or other substance tends to turn it to inclined position as shown in dotted lines in said figure. Above the scoop is arranged a supply hopper having a pivoted cut-off similar to that heretofore described and operated by an arm $p^2$ secured rigidly to the side of the scoop.

To retain the scoop in upright position it is provided with a catch pin or projection $q$ which co-operates with a lateral projection $g^3$ Figs. 6 and 6ª on the spring pressed catch lever Q mounted on an arm Q' of the standard Q² carrying the hopper.

An electro magnet R co-operates with an armature R' on the lever Q to release the catch projection at the proper moment. The circuit controlling the magnet is established by a gravitating contact such as before described operated by the beam. This contact is preferably located in the central standard as shown at S and the circuit wires pass through the base and up to the magnet as shown.

From the foregoing, the operation will be readily understood; thus, in the grain scales, assuming that the cut-off is open the grain or other substance flows from the hopper into the upper compartment of the measuring vessel until the beam moves up, indicating that the vessel has received the quantity of grain desired. In its upward movement, the beam moves the gravitating contact K and establishes the circuit through electro magnet G which in turn instantly releases the cut off lever and under the action of its spring the cut-off closes the opening from the hopper, and through the arm and link E² Fig. 2 releases the catch or lock E', permitting the vessel to turn half way over, dumping the grain in the compartment at one end, and bringing the compartment at the other end up into position to receive grain from the hopper. To again open the cut-off, as the vessel nears the end of its movement, one of the lugs $f^2$ on its side strikes the lug $f'$ on the lever F moving the latter and causing it to engage the end of the cut-off lever $f$, opening the cut off and moving the lever $f$ back beneath the catch $g$, when the parts are in their original position, and the operations just described are again gone through with, until the whole quantity of grain is measured.

With the grocer's scales, the operation is the same, save that the measuring vessel does not rotate but simply oscillates and the lever arm $p^2$ (before described) on its side, is employed to operate the cut off instead of the lever F as in the other instances.

With scales constructed in accordance with this invention grain and similar substances may be measured with almost absolute accuracy, and with any of the ordinary well known tallying mechanisms, a perfect record may be kept, the measuring and tallying operations being carried on automatically from beginning to end.

It is entirely practical to locate the counter or tallying device at a distant point and operate the same through the medium of an electric circuit for releasing and measuring vessel. In Fig. 5, a counter $u$ is shown in this circuit and may be located at a distant point, as for instance, in the office of an elevator or mill, while the scale itself is located in any suitable place.

While I have shown and described an electrically operating tallying device it is obvious that any of the ordinary well known mechanism of this character may be employed whether operated electrically or mechanically by the tilting of the measuring vessel, the only essential being that no additional weight or resistance be offered to the movement of the scale beam.

What I claim is—

1. In an automatic weighing scales, the combination with the releasing mechanism for automatically discharging the substance being weighed and an electro magnet controlling said releasing mechanism, of an electric circuit including said magnet and a gravitating contact maker in said circuit tripped by the scale and allowed to continue its movements independently whereby the circuit is established without perceptibly weighting the scale beam; substantially as described.

2. In an automatic weighing scales the combination with the releasing mechanism, whereby the substance being weighed is automatically discharged and an electro magnet controlling said releasing mechanism, of an electric circuit including said magnet, a contact maker in said circuit having a gravitating member, the movement of which is initiated by the scale and completed by gravity to establish the circuit and release the substance being weighed.

3. In an automatic weighing scales, the combination with the measuring vessel, and releasing mechanism for discharging the grain therefrom, scale beam and electro magnet controlling the releasing mechanism, of the electric circuit including said magnet, the contact included in said circuit moved into inclined position by the scale beam, the loose member in said contact adapted when the contact is inclined to fall by gravity and establish the circuit through the magnet; substantially as described.

4. In an automatic weighing scales, the combination with the pivoted measuring vessel, the platform carrying the supports for said vessel, the scale beam, the hopper and the cut off for the hopper, of the catch controlling the movement of the vessel, moved by the cut-off, the electro magnet controlling said cut off the gravitating contact maker moved by the scale beam and the electric circuit including said contact maker and magnet; substantially as described.

5. In an automatic scale, the combination with the automatic weighing mechanism, the hopper and the cut off controlling the passage of grain from the hopper, of the two electro magnets successively controlling said cut off, electric circuits including said magnets and contacts included in said circuits and moved by the scales to establish the circuits successively, as the weight increases, whereby the flow of grain from the hopper may be reduced and finally cut off entirely; substantially as described.

6. In an automatic scale, the combination with the automatic weighing mechanism, the hopper and the spring pressed cut off controlling the passage of grain from the hopper to the scales, of the two electro magnets successively controlling the cut off, electric circuits including said magnets, contacts in said circuits operating to close the circuits successively and moved by the scale beam, whereby one circuit and magnet is energized to partially close the cut off then the other circuit and magnet is energized to completely close said cut off as the weight on the scales increases; substantially as described.

7. In an automatic weighing scales, the combination with the automatic weighing mechanism, the hopper and cut off therefor, of the electro magnetically operated catch for said cut off consisting of the pivoted member having the armature thereon and the member jointed to said first mentioned member and having a shoulder for engaging the cut off; substantially as described.

DANIEL DRAWBAUGH.

Witnesses:
EDWARD E. JAUSS,
EDGAR L. KING.